(12) United States Patent
Dobbin (10) Patent No.: US 12,060,161 B2
(45) Date of Patent: Aug. 13, 2024

(54) SPARK CONTAINMENT CAP

(71) Applicant: AIRBUS OPERATIONS LIMITED, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 367 days.

(21) Appl. No.: 17/427,550

(22) PCT Filed: May 28, 2020

(86) PCT No.: PCT/EP2020/064787
§ 371 (c)(1),
(2) Date: Jul. 30, 2021

(87) PCT Pub. No.: WO2020/239881
PCT Pub. Date: Dec. 3, 2020

(65) Prior Publication Data
US 2022/0135246 A1 May 5, 2022

(30) Foreign Application Priority Data
May 30, 2019 (GB) ..................... 1907699

(51) Int. Cl.
| F16B 37/14 | (2006.01) |
| B64D 45/02 | (2006.01) |
| F16B 33/00 | (2006.01) |

(52) U.S. Cl.
CPC ............ *B64D 45/02* (2013.01); *F16B 33/004* (2013.01); *F16B 37/14* (2013.01)

(58) Field of Classification Search
CPC ........ F16B 43/02; F16B 37/14; F16B 33/004; B64D 45/02
(Continued)

(56) References Cited

U.S. PATENT DOCUMENTS 1,244,915 A * 10/1917 Stafford .................... F22B 7/16
411/380
1,250,240 A * 12/1917 Flannery ................. F16B 37/14
411/374
(Continued)

FOREIGN PATENT DOCUMENTS

| CN | 1124334 | 6/1996 |
| CN | 102187105 | 9/2011 |

(Continued)

OTHER PUBLICATIONS

International Search Report and Written Opinion for PCT/EP2020/064787 dated Sep. 4, 2020, 20 pages.
(Continued)

*Primary Examiner* — Flemming Saether
(74) *Attorney, Agent, or Firm* — Nixon & Vanderhye P.C.

(57) ABSTRACT

A spark containment cap forms a sealed cavity around an end of a fastener protruding from a structure. The cap has a cap body defining an air cavity enclosing the end of the fastener. The cap body includes an annular base (210) terminating at a base rim (211) surrounding an opening into the air cavity. An annular skirt of the cap provides an annular sealing volume extending around the base rim to receive an annular bead of a curable sealing material around the opening into the cavity to provide a seal between the cap body and the structure to seal a volume of gas within the cavity. The cap body includes a cap upper to receive the end of the fastener. The cap upper (220) is positionable so that an axis of the cap upper is offset from an axis of the annular skirt (230).

13 Claims, 4 Drawing Sheets

(58) Field of Classification Search
USPC .................. 411/537, 538, 379–381
See application file for complete search history.

(56) References Cited

U.S. PATENT DOCUMENTS

| | | | | |
|---|---|---|---|---|
| 1,401,683 | A * | 12/1921 | Flannery | .................. F22B 7/16 411/380 |
| 1,498,019 | A * | 6/1924 | Dodds | ...................... F22B 7/16 411/374 |
| 4,905,931 | A | 3/1990 | Covey | |
| 5,181,817 | A * | 1/1993 | Anderson | ............... F16B 5/025 411/372.5 |
| 5,466,084 | A | 11/1995 | Brueggen et al. | |
| 8,882,423 | B2 | 11/2014 | Watanabe | |
| 9,011,062 | B2 | 4/2015 | Chirol et al. | |
| 9,416,811 | B2 | 8/2016 | Dobbin | |
| 10,220,957 | B2 * | 3/2019 | Dobbin | ................. F16B 33/004 |
| 2010/0080667 | A1 | 4/2010 | Reed | |
| 2012/0219380 | A1 | 8/2012 | Hutter, III | |
| 2013/0119335 | A1 | 5/2013 | Park et al. | |
| 2014/0130335 | A1 | 5/2014 | Bickford et al. | |
| 2014/0321944 | A1 | 10/2014 | Chirol et al. | |
| 2016/0169266 | A1 | 6/2016 | Dobbin et al. | |
| 2019/0161206 | A1 | 5/2019 | Dobbin | |
| 2020/0011368 | A1 | 1/2020 | Mahaffey | |
| 2022/0063837 | A1 | 3/2022 | Dobbin | |

FOREIGN PATENT DOCUMENTS

| | | |
|---|---|---|
| CN | 105473445 | 4/2016 |
| CN | 107658080 | 2/2018 |
| CN | 108291573 | 7/2018 |
| EP | 0 334 011 A1 | 9/1989 |
| EP | 3 059 170 | 8/2016 |
| EP | 3 085 626 | 10/2016 |
| GB | 2535518 | 8/2016 |
| GB | 2523125 B | 10/2016 |
| GB | 2557961 | 7/2018 |
| GB | 2525125 B | 9/2018 |
| GB | 2572337 | 10/2019 |
| GB | 2584433 A | 12/2020 |
| JP | 07005292 | 2/1995 |
| JP | 2013/119335 | 6/2013 |
| JP | 5901263 | 4/2016 |
| JP | 6538947 B1 | 7/2019 |
| WO | 2014/118510 | 8/2014 |
| WO | 2015/025130 | 2/2015 |

OTHER PUBLICATIONS

Combined Search and Examination Report for GB1907699.1 dated Oct. 24, 2019, 6 pages.
Chinese Office Action cited in Application No. 202080011635.5 mailed Apr. 6, 2023, 18 pages.
Combined Search And Examination Report for GB2013568.7 dated Jan. 7, 2021, 5 pages.

* cited by examiner

SPARK CONTAINMENT CAP

RELATED APPLICATIONS

This application is the U.S. national phase of International Application PCT/EP202/064787 filed May 28, 2020, which designated the U.S. and claims priority to United Kingdom patent application GB 1907699.1 filed May 30, 2019, the entire contents of each of which are hereby incorporated by reference.

FIELD OF THE INVENTION

The present invention relates to a spark containment cap. The present invention also relates to a spark containment cap assembly, a fastening system, a fastener joint, an aircraft and a method of securing a fastener and a spark containment cap to a structure.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightning attachment at any of the many metallic fasteners in the exterior surface, which have a much lower electrical resistance. In the wing, some of these fasteners pass through the outer wing skin into the fuel tank.

Figure 1:
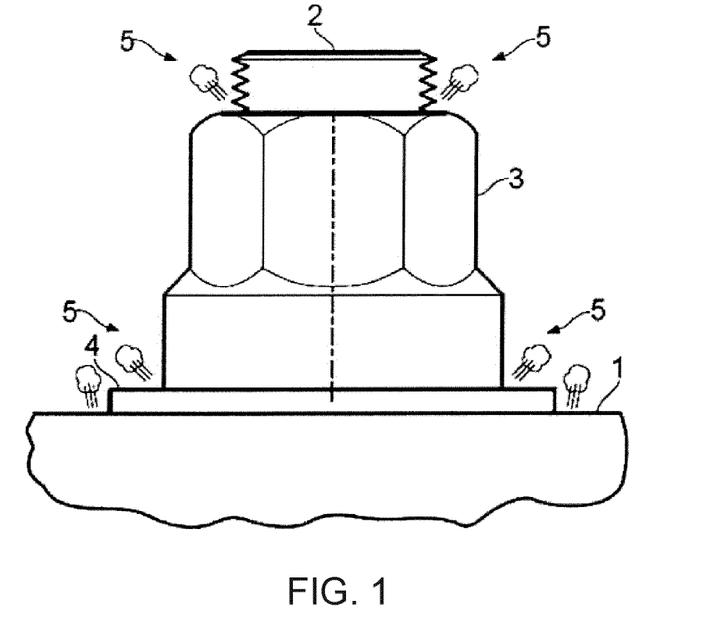
FIG. 1 is a side view of a prior art fastener joint.

FIG. 1 is a side view of part of a fastener assembly passing through a panel 1, which may be a composite or metallic panel. The assembly comprises a fastener comprising an externally threaded bolt 2, an internally threaded nut 3, and a washer 4. In the event of a lightning strike hitting the panel 1 and attaching to the fastener, sparking, plasma or outgassing may occur at the locations indicated by reference 5 in FIG. 1.

It is known to provide a spark containment cap over the end of the fastener. The cap forms a sealed cavity around an end of a fastener protruding from a structure. A volume of gas is enclosed in the sealed cavity around the fastener. The gas provides spark suppression for arcing that may occur between the composite structure and the metal fastener during any lightning strike. The cap is sealed to the structure by a curable sealant provided around an opening to the sealed cavity.

Another spark containment cap, formed as an injectable nut cap is known from WO 2015/025130. An inner cap body is provided which surrounds an opening into a central cavity. An annular skirt provides an annular pocket between the skirt and the inner cap body. Sealing material is injected into the annular pocket through an inlet, with air and excess sealing material flowing from an outlet on an opposing side of the skirt.

Typically, the end of the fastener extends perpendicular to a surface of the structure from which the fastener protrudes. However, the axis of the fastener may be inclined at an angle to the surface of the structure. Such a configuration may make installation of a sealed cap arrangement over the end of the fastener more difficult and less efficient.

SUMMARY OF THE INVENTION

According to an aspect of the invention, there is provided a spark containment cap for forming a sealed cavity around an end of a fastener protruding from a structure, the cap comprising: a cap body defining an air cavity arranged to enclose the end of the fastener, and including an annular base terminating at a base rim which surrounds an opening into the air cavity; and an annular skirt to provide an annular sealing volume extending around the base rim arranged to receive an annular bead of a curable sealing material around the opening into the cavity to provide a seal between the cap body and the structure to seal a volume of gas within the cavity; wherein the cap body comprises a cap upper arranged to receive at least part of the end of the fastener, the cap upper being positionable so that an axis of the cap upper is offset from an axis of the annular skirt.

With such an arrangement, it is possible to help ensure that the skirt is in abutment with the structure along all or substantially all of the skirt's rim. The size of the air cavity and therefore the cap may be minimised as the need to account for misalignment is minimised. The cap is able to account for the fastener extending along a non-perpendicular axis from the surface of the structure.

The offset may be an angular offset.

As such, the cap is able to better accommodate inclined surfaces of the structure.

The cap upper may be arranged to pivot relative to the annular skirt.

The cap may comprise a joint between the annular skirt and the cap upper.

A juncture of the joint may be in the annular sealing volume.

Accordingly, when sealant is cured in the sealing volume, the sealant may also act to seal the joint. The sealant may act to fix the joint.

The joint may comprise a ball joint. As such, pivoting of the cap upper may be easily achieved.

The joint may be on an external side of the cap body. As such fluid paths to the interior may be limited.

The joint may comprise a deformable portion. The deformable portion may comprise a concertina configuration.

The annular skirt may comprise a skirt portion terminating at a skirt rim arranged to locate against the structure along at least substantially all of the skirt rim.

The skirt portion may be rigid. As such, the skirt rim is restricted from deforming upon application of an injection pressure to the sealing volume.

The cap may comprise a sealing material inlet communicating with the annular sealing volume and an air outlet communicating with the annular sealing volume. The air outlet may be formed through the annular skirt. Such an air outlet may be a hole formed through the skirt. The air outlet may be formed in the skirt rim, for example as a recess (also may be known as a mouse hole).

The annular skirt may be locatable so that the axis of the annular skirt is offset from an axis of the base rim.

As the diameter of the rim of the annular skirt is greater than the diameter of the base rim, an offset between the cap and the surface of the structure will have a greater effect on a gap between the annular skirt and the surface than on a gap between the base rim and the surface.

The skirt rim and base rim may be holdable in a fixed position relative to each other during injection of sealant.

The cap upper and the annular base may be formed as a one-part component.

The annular base may be configured to pivot with the cap upper.

The cap upper may be locatable so that the axis of the cap upper is offset from an axis of the base rim.

As such, it is possible to aid closure of the air cavity with the surface of the structure to restrict sealant leakage into the air cavity during injection of sealant.

The cap may comprises a base joint between the annular base and the cap upper. With such an arrangement it is possible to adjust the axis of the cap upper and align the planes of the base rim and surface of the structure.

The base joint may comprise a deformable portion. As such, the presence of a fluid path through the cap body is restricted.

The annular base and the annular skirt may be formed as a one-part component.

The annular base and the annular skirt may be arranged to pivot together relative to the upper part.

The cap upper may be deformable. As such, the axis of the cap upper may be easily adjusted.

According to an aspect of the present invention, there is provided a cap assembly comprising a spark containment cap and a cured sealing material, wherein the axis of the cap upper is offset from the axis of the annular skirt.

According to an aspect of the present invention, there is provided a fastening system comprising a spark containment cap as described above, and a fastener, the cap body being configured to receive the fastener.

The fastener may be a blind fastener. The blind fastener may be a blind rivet.

The fastening system may comprise a locating member configured to extend through an aperture in the structure to locate the spark containment cap with respect to the aperture in the structure prior to insertion of the fastener.

With this arrangement it is possible to correctly align the fastening collar and cap. This aids alignment of the fastening system. The arrangement helps hold the cap in correct alignment during curing of a sealant, and reacts against any pressure applied by the curable sealant.

The locating member may include an engagable member removably received through the aperture in the structure to engage with the cap. The engagable member may engage with the cap upper.

The engagable member may comprise an adhesive. The engagable member may comprise a protrusion. The protrusion may be one or more of a head, a shoulder and a rib. The engagable member may comprise a helical thread. The engagable member may comprise a recess. The recess may be a groove.

The cap upper may comprise an engaging feature. The engaging feature may be at the closed end of the cap upper. The engaging feature may be configured to engage with the engagable member of the locating member.

The engaging feature may comprise an adhesive. The engaging feature may comprise a protrusion. The protrusion may be one or more of a head, a shoulder and a rib. The engaging feature may comprise a helical thread. The engaging feature may comprise a recess. The recess may be a groove.

The engagable member may be selectably releasable from the cap.

The drawing arrangement may comprise a resilient element.

The resilient element may comprise at least part of the locating member.

The locating member may be an elastomeric shaft.

The drawing arrangement may be at the other end of the locating member to the engagable member. Optionally, the drawing arrangement may be configured to act against the structure to draw the engagable member towards the structure.

The drawing arrangement may be a fastening collar. Optionally, the fastening collar is a nut.

The locating member may be a shaft.

The fastening system may comprise an annular bead of uncured sealing material, the bead of sealing material being curable to provide a seal between the cap body and the structure to seal a volume of gas within the cavity.

According to an aspect of the present invention, there is provided a fastener joint comprising: a structure; a fastener having a fastener end protruding from a surface of the structure; and a spark containment cap including: a cap body defining an air cavity arranged to enclose the end of the fastener with an annular base terminating at a base rim which surrounds an opening into the air cavity; an annular skirt with a skirt rim providing an annular sealing volume extending around the base rim arranged to receive an annular bead of a curable sealing material around the opening into the cavity to provide a seal between the cap body and the structure to seal a volume of gas within the cavity; and a cured sealing material in the annular sealing volume which secures the cap to the structure to thereby seal a volume of gas within the air cavity; wherein an axis of the fastener extends non-perpendicular to the surface, the skirt rim extends parallel to the surface, and at least part of the cap body extends at least substantially parallel to the axis of the fastener.

According to an aspect of the present invention, there is provided a method of securing a fastener and a spark containment cap to a structure, the method comprising: locating the spark containment cap over an aperture for receiving an end of the fastener to form an air cavity defined by a cap body and arranged to enclose the end of the fastener, the cap including an annular base terminating at a base rim which surrounds an opening into the air cavity; and an annular skirt to provide an annular sealing volume extending around the base rim; positioning a cap upper of the cap to be at least substantially parallel with an axis of the aperture; and injecting an annular bead of a curable sealing material around the opening into the cavity to provide a seal between the cap body and the structure to seal a volume of gas within the cavity.

The method may include inserting a blind rivet through the structure following injection of an annular bead of a curable sealing material around the opening into the cavity.

The method may include inserting the fastener through the aperture prior to locating the spark containment cap over the aperture.

According to an aspect of the present invention, there is provided an aircraft comprising at least one of a spark containment cap as described above, a cap assembly as described above, a fastening system as described above, and a fastener joint as described above.

The structure may comprise a boundary of an aircraft fuel tank.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
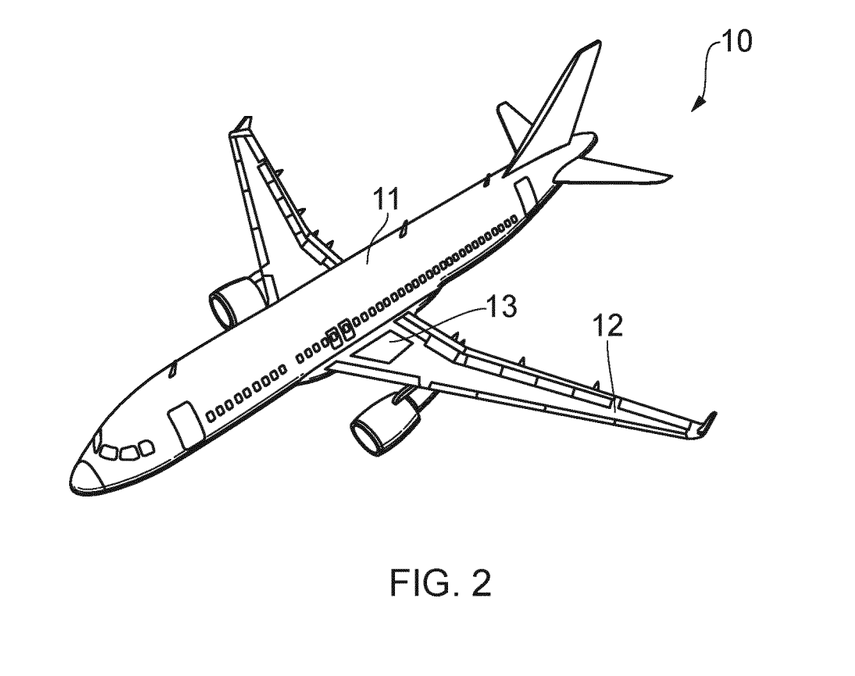
FIG. 2 is a perspective view of an aircraft.

An aircraft 10 is shown in FIG. 2. The aircraft 10 includes a fuselage 11. Two wings 12 extend from the fuselage 11. It will be appreciated that the fuselage 11 and wings 12 may take a variety of different planform shapes and profiles depending on the particular application. Fuel tanks 13 are formed in the fuselage 11 and wings 12. One such fuel tank 13 is schematically shown in FIG. 2. The fuel tanks 13 are formed by a structure or structures forming part of the aircraft 10.

FIGS. 3 to 7 show a fastener joint 100 in stages of installation. Referring in particular to the installed fastener joint 100 shown in FIG. 3, the fastener joint 100 comprises a structure 110, a fastener 120 and a spark prevention cap 200.

Figure 3:
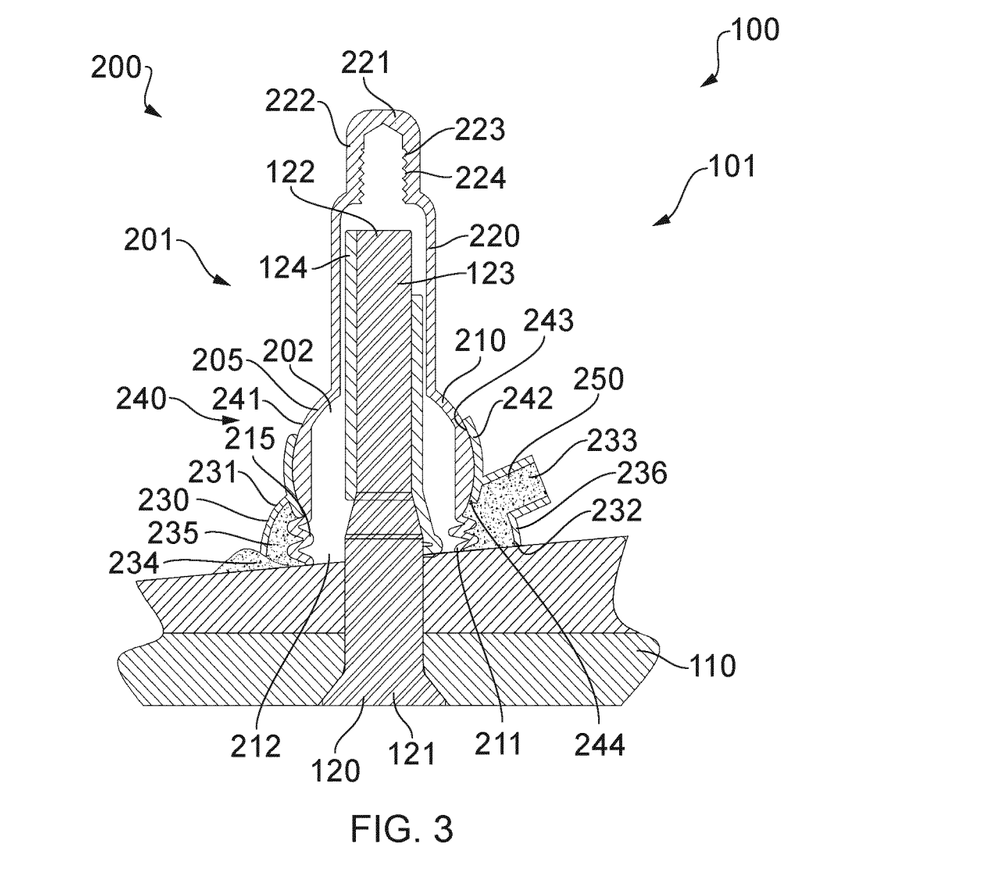
FIG. 3 is a cross-sectional side view of a fastener joint with a structure, a fastener and a spark prevention cap located over an end of the fastener.

The structure 110 includes an aircraft skin panel 111 joined to another component, such as a structural feature, element, and/or another panel 112. A fastener 120 extends through the structure 110. The components of the structure 110 in this embodiment are composite aircraft structural components, but may be a hybrid composite-metallic components, or another structure. The fastener 120 extends through an aperture 113 in the structure 110.

Figure 4:
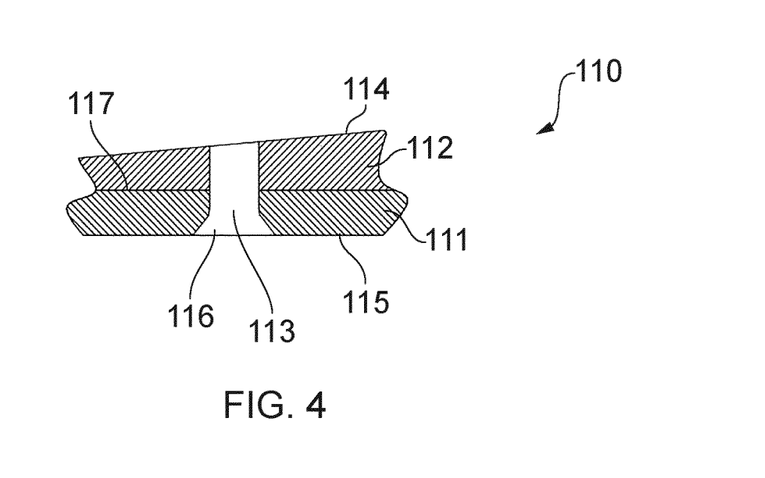
FIG. 4 is a cross-sectional side view of a structure with a fastener receiving aperture formed through first and second panels of the structure.

As shown in FIG. 4, the structure 110 has a first, inner, surface 114 and a second, outer, surface 115. The fastener receiving aperture 113 extends between the inner and outer surfaces 114, 115. The fastener receiving aperture 113 is pre-formed, for example by drilling, in the structure 110 prior to installation. The components of the structure 110 are brought together and the aperture 113 is formed with a tool, such as a drill bit (not shown). The aperture 113 is formed to have a diameter corresponding to the diameter of the fastener 120. A countersink 116 is formed on the outer side of the structure to receive a fastener head 121. The panels 111, 112 of the structure have intermediate surfaces 117 that abut against each other.

An end 122 of a fastener 120 protrudes from the structure 110. The fastener 120 is a blind fastener. As such, the fastener 120 can be inserted and fully installed in the aperture 113 from only one side of the structure 110, "blind" to the opposite side of the structure 110. As shown in the Figures, the fastener 120 is inserted from the side of the aperture 113 which has a countersink 116.

In embodiments, the fastener 120 is a blind rivet. The fastener 120 has a fastener member 123. The fastener member 123 extends through the structure 110 and protrudes from the structure. The fastener 120 has a longitudinal fastener axis. The fastener axis is defined by the fastener member 123. The fastener member 123 includes a fastener sleeve 124. The fastener sleeve 124 deforms during installation of the fastener 120 to retain the fastener 120. Other blind fastener configurations are anticipated.

The end 122 of the fastener 120 protruding from the structure 110 protrudes from the inner surface 114. The angle at which the end 122 of the fastener 120 extends from the inner surface 114 is defined by an axis of the aperture 113 formed through the structure 110. Typically, the end 122 of the fastener 120 extends perpendicular to the surface 114 from which the fastener protrudes. However, in some circumstances the axis of the fastener 120 is inclined at an angle to the surface of the structure.

As shown in FIGS. 3 to 7, the surface 114 of the structure 110 extends on a plane at an inclined angle to the axis of the aperture 113. That is, non-perpendicular. In this arrangement, the inclined plane of the surface 114 relative to the axis of the aperture 113 is caused by a variance in the thickness of the panel 112. In an alternative configuration, for example, the inclined plane may be caused by the aperture 113 being formed in the panel 112 at an inclined angle to the plane of the surface 114, irrespective of any or no variation in thickness of the structure 110.

Figure 5:
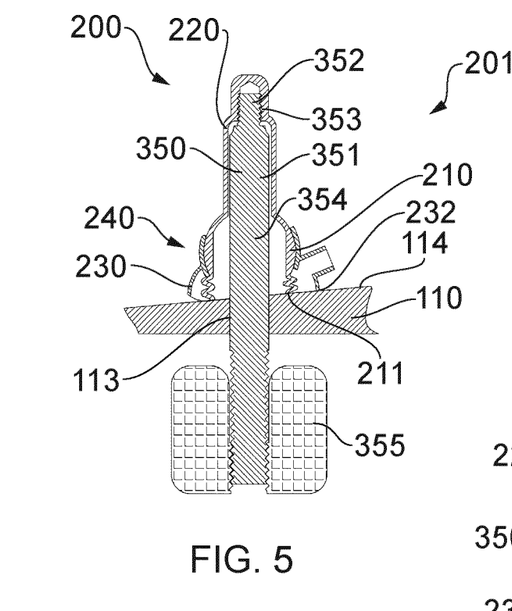
FIG. 5 is a cross-sectional side view of a fastening system for forming the fastener joint of FIG. 3 with the spark containment cap and a locator prior to installation of the fastener.

Referring to FIGS. 3 and 5 in particular, the cap 200 encloses the end 122 of the fastener 120. The cap 200 is a spark containment cap. The cap 200 abuts the structure 110. The cap 200 and fastener 120 together form a fastening system 101.

The cap 200 has a cap body 201. The cap body 201 has an annular base 210. A cap upper 220 extends from the annular base 210. The annular base 210 defines a proximal (inboard) part, and the cap upper 220 defines a distal (outboard) part. The annular base 210 is positioned against the structure 110 during assembly of the fastener joint 100.

The cap body 201 defines a central air cavity 202. The central air cavity 202 is configured to receive the end 122 of the fastener 120. The base 210 defines a lower, proximal, end of the central air cavity 202. The cap upper 220 defines an upper, distal, end of the central air cavity 202. A shoulder 205 extends between the base 210 and the cap upper 220.

The cap upper 220 is substantially cylindrical. The cap upper 220 has a closed end 221. The closed end 221 is generally planar, but may have another configuration such as domed. A section of reduced diameter 222 is formed at the closed end 221. An engaging feature 223 is on the inner side of the cap 200. The engaging feature 223 is in the interior of the cap 200. The engaging feature 223 is configured to engage with a locating tool 350 (refer to FIG. 5). The locating tool 350 is configured to interact with the aperture 113 and the cap 200 to locate the cap 200 over the aperture 113. The locating tool 350 also acts as an alignment aid to align the cap upper 220.

The engaging feature 223 is at the distal end of the cap 200. The engaging feature 223 is on the cap upper 220. The engaging feature 223 is defined by the section of reduced diameter 222 at the closed end 221, but may be elsewhere. The engaging feature 223 comprises a plurality of circumferentially extending ribs 224. Alternative configurations are possible. The engaging feature 223 may comprise one or more other protrusions. For example, the protrusions may be one or more of a head, a shoulder and a rib. The engaging feature 223 in embodiments may comprise a helical thread. The engaging feature 223 may comprise a recess. The recess may be a groove. The engaging feature may comprise an adhesive.

The cap upper 220 extends from the base 210. The base 210 forms an annular side wall. The base 210 terminates at a rim 211 which surrounds an opening 212 into the central air cavity 202. The rim 211 lies in a plane so it can intimately engage with a planar surface of the structure 110 around its full circumference when the cap is fitted over the end 122 of the fastener 120 as shown. The rim 211 is formed as a rigid ring.

An annular skirt 230 extends from an outboard (upper) end 231 where it meets the cap body 201 to an inboard (lower) skirt rim 232. Like the base rim 211, the skirt rim 222 also contacts the planar surface of the structure 110 around at least substantially the full closed circumference of the skirt rim 222. A joint 240 is defined between the skirt 230 and the cap body 201. The joint 240 allows the skirt 230 to move relative to the cap body 201 as will be described below. As such, the cap upper 220 is movable relative to the skirt rim 222. A skirt portion 236 defines the skirt rim 222. The skirt portion 236 forms a rigid ring. The skirt portion 236 is annular. The joint 240 provides for the skirt 230 to pivot about the cap body 201. As such, the skirt rim 232 is movable relative to the cap upper 220.

An annular pocket 235 is provided between the skirt 230 and the base 210. The annular pocket 235 acts as an annular sealing volume. The pocket 235 extends to an open inboard end at the skirt rim 222. Due to the flared shape of the skirt 230, the pocket 235 has a radial width which increases.

The skirt 220 has an injection channel 233. The injection channel 233 acts as an inlet. The injection channel 233 is arranged to interconnect with a sealing material injection device 400 (refer to FIG. 6) to provide a flow of sealing material 250 through the skirt via the injection channel 233 into the pocket 235. A suitable sealing material is a polysulphide sealant such as Naftoseal® MC238B, MC238A, or MC780 available from Chemetall Group, or a polythioeither sealant such as PR2001B available from PPG Inc.

The skirt 220 also has an outlet 234. The outlet 234 is in fluid communication with the pocket 235 and is arranged to enable air to escape the pocket 235 through the skirt 220 via the outlet 234 as the sealing material 250 flows from the injection channel 243 into the pocket 240. When the pocket 235 is full, then the pressure in the pocket increases until it forces sealing material to escape the pocket through the skirt via the outlet 234. When this flow of sealing material out of the outlet 234 is visually observed, the flow of sealing material 250 from the sealing material injection device 400 is stopped. A gap is formed about at least part of the skirt rim 222 to act as the outlet 234. In embodiments, the outlet 234 is an aperture through the skirt 220.

Alternative sealant arrangements may be provided to those shown. For example, the pocket may be prefilled with sealing material.

A base joint 215 is formed between the cap upper 220 and the rim 211. The base joint 215 allows the rim 211 and cap upper 220 to move relative to each other. The base joint 215 allows the rim 211 to pivot relative to the cap upper 220. The base joint 215 is a deformable portion. The base joint 215 in the present arrangement has a concertina configuration to allow portions of the cap body 201 either side of the base joint 215 to move relative to each other. The concertina configuration allows the joint to deform. The joint 215 has a reduced wall thickness. The concertina configuration of the base joint 215 extends circumferentially about the base 210. In the present arrangement, the joint 215 extends proximal to the rim 211, however it will be understood that the joint 215 may be spaced from the rim 211. Alternative arrangements of the base joint 215 are envisaged. For example, the base joint 215 may be formed by a resilient section received between a rigid rim portion and a rigid distal portion of the base 210.

The base joint 215 is integrally formed with the remainder of the cap body 201. This ensures that there is no flow path through the cap body 201 to the air cavity 202.

The joint 240 between the cap body 201 and the skirt 230 will now be described. The base 210 has a part-spherical outer face 241. The part-spherical outer face 241 in the present embodiment also forms the shoulder 205. The part-spherical outer face 241 forms part of the joint 240. The cap body 201 acts as a male part of the joint 240. The outer face 241 of the cap body 201 acts as a skirt connecting portion. The cap body 201 acts as a ball of a ball joint.

The skirt 220 has a body connecting portion. A collar 242 is at the outboard (upper) end 231 of the skirt 220. The collar 242 acts as a socket of a ball joint. The collar 242 has an arcuate inner face 243. The collar extends annularly. The collar 243 is assembled over the cap body 201. The collar 242 is pivotable about the part-spherical outer face 241. The collar 242 is retained on the base 210. The cap body 201 is pivotable in the collar 242. As such, the skirt 220 and cap body 201 are pivotable relative to each other. The collar 242 and base 210 are in a slide fit arrangement.

A juncture 244 of the joint 240 is formed in the pocket 235. The juncture 244 is formed at the juncture of the collar 242 and the cap body 201. When a sealing material 250 is provided in the pocket, the juncture 244 is sealed by the sealing material 280.

Once sealing material 250 is provided in the pocket 235, the sealing material 250 is then allowed to cure, leaving a cured sealing material in the pocket 235 which secures the cap to the structure and forms a seal around the cavity 202. The sealing material 250 forms an annular bead around the periphery of the cap 200, the bead of sealing material serving to seal the air cavity 202 in order to prevent escape of outgassing products, and to adhere the cap 200 to the structure 110. The seal prevents the ingress of water or other contaminants into the cavity 230, and also prevents plasma or other out-gassing products from exiting the cavity 230 in the event of a lightning strike. The cured sealant also prevents movement of the skirt 220 relative to the cap body 201.

Figure 8:
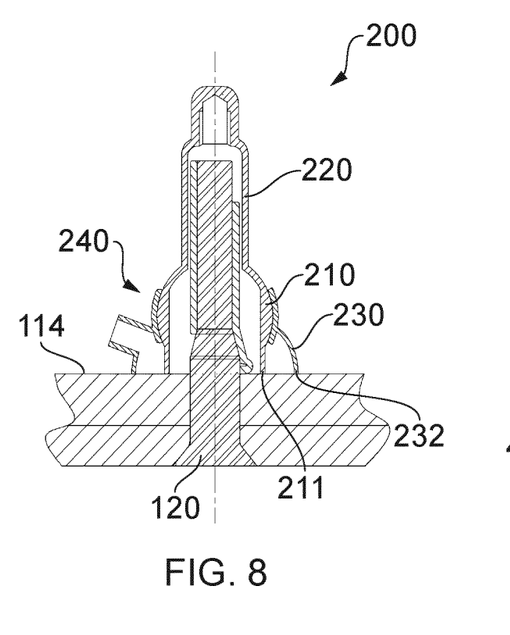
FIG. 8 is a cross-sectional side view of an alternative embodiment of the fastener joint after installation with a spark prevention cap installed on a surface extending perpendicular to the axis of the fastener, and with cured sealant omitted for clarity.

Referring to FIG. 8, an alternative embodiment of the cap 200 is shown in which the base joint is omitted. In such an embodiment, the rim 211 of the base 210 is not capable of moving relative to the cap upper 220. The rim 211 and cap upper 220 are in a fixed relationship with each other. The joint 240 provides for the skirt 230 to pivot about the cap body 201. As such, the skirt rim 232 is movable relative to the cap upper 220. The plane of the skirt rim 232 is movable to an offset orientation from the plane of the rim 211. The cap 200 shown in FIG. 8 is otherwise substantially the same as the cap as described above and so a detailed description will be omitted.

Parts of the cap 200 are formed by injection moulding or similar. A suitable material is a glass filled polyetherimide (PEI) resin such as Ultem 2400 or Ultem 2310, available from SABIC Innovative Plastics Holding BV, or Nylon PA6, PA66 or PA12.

Figure 6:
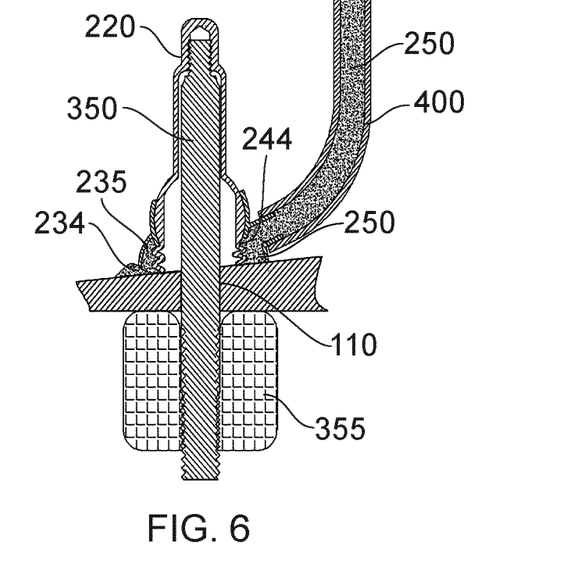
FIG. 6 is a cross-sectional side view of the fastening system of FIG. 5 from, part-way through the installation process, with a curable sealing material being injected with a sealant injection tool.
Figure 7:
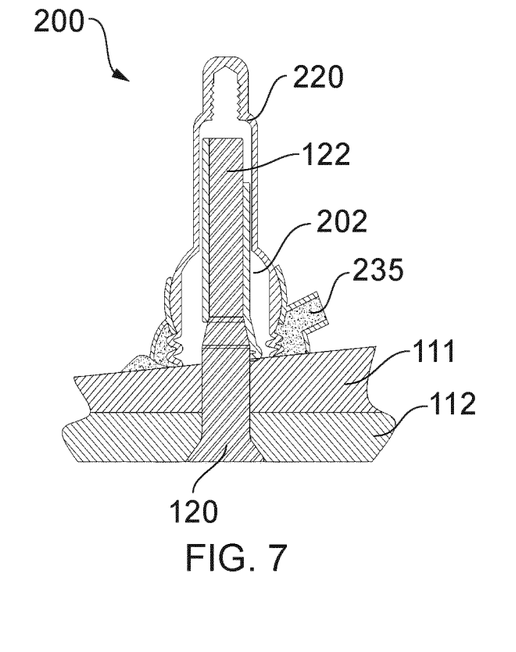
FIG. 7 is a cross-sectional side view of the fastener joint after installation.

The fastening system 101 includes the locator 350 as shown in FIGS. 5 and 6. The locator 350 acts as the locating tool. The locator 350 is configured to locate the cap 200 over the aperture 113 in the structure 110.

The locator 350 comprises a locating member 351. The locating member 351 is configured to locate in the aperture 113 to align the cap 200 over the aperture 113. The locator 350 comprises a shaft 355. The shaft 354 has a diameter corresponding to the diameter of the aperture 113. When received through the aperture 113, the axis of the shaft 354 aligns with the axis of aperture 113. The locating member 351 extends coaxial with the aperture 113.

A locating member 351 comprises an engagable member 352. The engagable member 352 is at the end of a shaft 354 defining the locating member 351. The engagable member 352 is removably received through the aperture 113. The engagable member 352 releasably engages with the cap 200. The engagable member 352 releasably engages with the engaging feature 223 of the cap body 201. The engagable member 352 releasably engages with the cap upper 220.

The engagable member 352 comprises a plurality of circumferentially extending ribs 353. Alternative configurations are possible. The engagable member 352 may comprise one or more other protrusions. For example, the protrusions may be one or more of a head, a shoulder and a rib. The engagable member 352 in embodiments may comprise a helical thread. The engagable member 352 may comprise a recess. The recess may be a groove. The engagable member 352 may comprise an adhesive.

A fastening collar 355 is at the opposing end of the shaft 354 to the engagable member 352. The fastening collar 355 is utilised as a drawing arrangement to draw the shaft 353 through an aperture 113 in the structure 110. This action draws the engagable member 352 towards the surface 114 and so biases the cap 200 against the structure 110.

The fastening collar 355 is movably engaged with the free end of the locating member 351. The fastening collar 355 is a nut, such as a wing nut, which is threadingly engaged with the locating member 351. The fastening collar 355 is removable from the locating member 351. The fastening collar 355 acts as the drawing arrangement. The shaft 354 locating member 351 is rigid.

Upon biasing the cap 200 against the structure 110 with the locator 350, sealing material is then inserted into an annular sealing volume of the cap 200 and cured. An annular bead of cured sealing material is formed to affix the cap 200 to the structure 110. A withdrawal force is then imparted on the locator 350 to disengage the locating member 351 from the cap 200. The locating member 351 is then drawn through the aperture 113 to remove the locator 350. The locator 350 is reusable. As shown in FIG. 3, the blind fastener 120 may then be inserted through the aperture 113 and engaged to form the joint.

Referring now to FIGS. 4 to 7 in particular, installation of the fastening system 101 to form the fastener joint 100 will now be described.

During assembly, the panels 111, 112 are brought together and the aperture 113 and countersink 116 are formed. The axis of the aperture 113 as shown in the Figures is at an inclined angle to the surface 114 of the structure 110. That is, non-perpendicular.

One of the panels 111 is then removed. As shown in FIG. 5, the fastening collar 355 is absent from the locating member 351 during initial assembly. The shaft 354 protrudes from the cap 201. The engagable member 352 is releasably engaged with the cap 200. The engagable member 352 removably engages with the engaging feature 223 on the cap upper 220.

To assemble the cap 200 with the structure 110, the assembled cap 200 and locating member 351 are aligned with the aperture 113 in the structure 110. The distal end of the locating member 351 is inserted through the aperture 113. The locating member 351 protrudes from the aperture 113 on an opposing side to the cap 200. The locating member 351 is aligned by the aperture 113 and so is coaxial with the axis of the aperture 113. With the inclined surface 114 of the structure 110, the end of the locating member 351 with the cap 200 protrudes from the aperture 113 at a non-perpendicular angle to the surface 114 from which it protrudes.

The fastening collar 355 is releasably engaged with the locating member 351. The fastening collar 355 is threadingly engaged with the locating member 351. As such, rotation of the fastening collar 355 moves the collar 355 into abutment with the intermediate surface 117 of the panel 112. The fastening collar 355 is further engaged to draw the locating member 351 in a direction through the aperture 113. As such, the cap 200 is moved into abutment with the structure 110 over the aperture 113.

As the cap 200 is drawn against the surface 114, the skirt rim 232 of the skirt 230 contacts the surface 114. The skirt 230 is urged to pivot about the joint 240. The skirt 230 is urged to pivot relative to the cap body 201. The cap upper 220 is held by the locating member 351 in alignment with the aperture 113. As such, the cap upper 220 is retained in a coaxial orientation with the aperture 113. As the cap 200 is further drawn against the surface 114, the skirt rim 232 is brought into contact with the surface 114 about its circumference. The skirt rim 232 is biased against the structure 110.

The rim 211 of the base 210 also contact the surface 114. As the cap 200 is drawn against the surface 114, the base joint 215 causes the rim 211 to pivot relative to the axis of the aperture 113, and to pivot about the cap upper 220. The base joint 215 deforms. As the cap 200 is further drawn against the surface 114, the rim 211 is brought into contact with the surface 114 about its circumference. The rim 211 is biased against the structure 110. The rim 211 and skirt rim 232 locate against the surface of the structure 110 and are in abutment with the surface 114 around their diameter. The axis of the cap upper 220 is aligned with the aperture 113. The cap upper 423 is able to accommodate an offset of the axis of the aperture.

In the embodiment shown in FIG. 8, the rim 211 of the base 210 is not capable of moving relative to the cap upper 220. As such, the skirt rim 232 is movable relative to the cap upper 220, with the base rim 211 and cap upper 220 in a fixed relationship with each other. When the skirt rim 232 contacts the surface 114 the skirt 230 pivots to bring the skirt 230 into alignment with the surface 114. When the base rim 211 contacts the smaller diameter of the base rim 211 means that the possible offset between the base rim 211 and the surface 114 is minimised. In an embodiment, the base rim 211 is deformable.

As shown in FIG. 6, pre-mixed sealing material 250 is then injected into the annular pocket 235. When the annular pocket 235 is full it overflows through outlet 234, causing an evenly distributed flow of sealing material 250. The sealing material 250 completely fills the annular pocket 235 until it flows into contact with the structure 110. As the rim 211 and skirt rim 232 locate against the surface of the structure 110 and are in abutment with the surface 114 around their diameter, sealing material 250 is retained in the annular pocket 235. The sealing material 250 extends over the juncture 244 of the joint 240 so that the juncture 244 is sealed by the sealing material 280.

The curable sealing material 250 is left to cure. On curing, it provides a strong adhesive bond between the cap 200 and structure 110. The sealing material 250 may cure to handling strength (i.e. a degree suitable to provide sufficient strength to withstand knocks or similar from assembly workers) in approximately two hours for epoxy-based adhesive sealing materials, four hours for polythioether sealants, or over four hours for polysulphide sealants.

During cure of the sealing material 250 (or at least until the sealing material is partially cured) the locator 350 is left in position. The locator 350 holds the cap 200 in position relative to the aperture 110. Once the sealing material 250 has cured, or at least partially cured, the structure 110 may be further assembled with other structures, such that access to the side of the structure 110 with the cap 200 is restricted.

Once the sealing material 250 has fully cured, the locator 350 is withdrawn. The engagable member 352 is disengaged from the cap 200. The cap upper 220 is retained in position. The cap 200 is securely fixed with the structure, 110.

Figure 10:
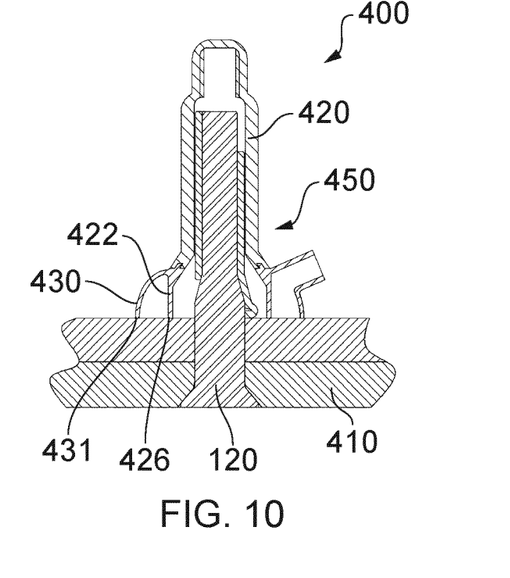
FIG. 10 is a cross-sectional side view of an alternative embodiment of the fastener joint after installation with a spark prevention cap installed on a surface extending perpendicular to the axis of the fastener, and with cured sealant omitted for clarity.
Figure 11:
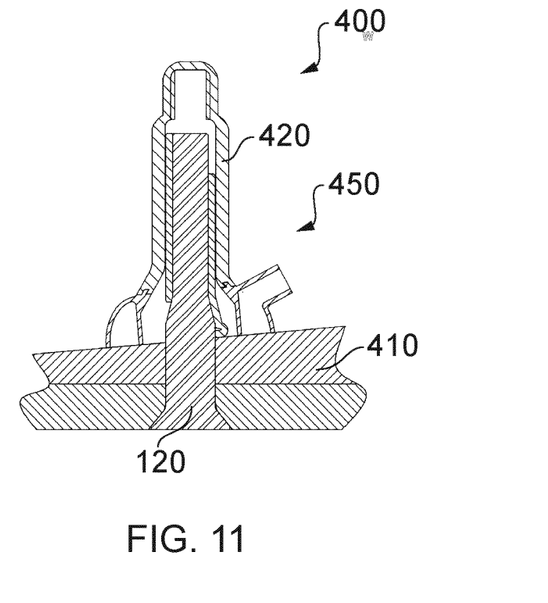
FIG. 11 is cross-sectional side view of the alternative embodiment of the fastener joint of FIG. 10 after installation with the spark prevention cap installed on a surface extending at an inclined angle to the axis of the fastener, and with cured sealant omitted for clarity.

Upon removal of the locator 350, the panels 111, 112 are brought together. The end 122 of a fastener 120 is inserted through the aperture 110 from the outer side to protrude from the structure 110. The end 122 of the fastener 120 protrudes in the central air cavity 122. The cap upper 220 is aligned with the axis of the fastener 120. The fastener 120 can be inserted and fully installed in the aperture 113 from only one side of the structure 110, "blind" to the opposite side of the structure 110. As shown in FIGS. 8, 10 and 11, the left side of the sectioned fastener 120 shows the fastener in a pre-engaged state, and the right side shows the fastener in a post engaged-state in which the sleeve is engaged to secure the fastener.

Figure 9:
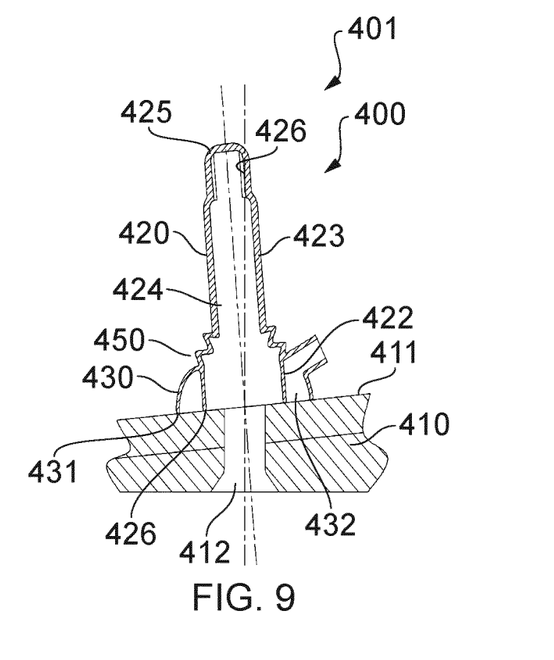
FIG. 9 is a cross-sectional side view of an alternative embodiment of a spark prevention cap on a surface extending at an inclined angle to the axis of the fastener receiving aperture

FIG. 9 shows another embodiment of a spark containment cap 400. The spark containment cap 400 is used to form a fastener joint 401. The fastener joint 401 generally corresponds to the fastener joint 100 described above and so a detailed description of common features will be omitted below. In FIG. 9, the sealant and fastener are omitted. The end of the fastener (not shown) protrudes from the structure 410. The fastener is a blind fastener. The locator acting as the locating tool is also omitted. The joint 401 comprises a structure 410 with a surface 411 and an aperture 412. The structure corresponds to the structure 110 described above.

In the embodiment described with reference to FIG. 9, the cap 400 has a cap body 420. The cap body 420 has an annular base 422. A cap upper 423 extends from the annular base 422. The annular base 422 is positioned against the structure 410 during assembly of the fastener joint. A central air cavity 424 is defined by the cap body 420. The central air cavity 424 is configured to receive the end of the fastener. The base 422 defines a lower, proximal, end of the central air cavity 424. The cap upper 423 defines an upper, distal, end of the central air cavity 424. The cap upper 423 is substantially cylindrical. The cap upper 423 has a closed end 425. An engaging feature 426 is on the inner side of the cap 400 to engage with the locating tool.

The base 422 terminates at a rim 426 which surrounds the opening into the central air cavity 424. The rim 426 lies in a plane so it can intimately engage with a planar surface of the structure 410 around its circumference when the cap is fitted over the end of the fastener as shown. The rim 426 is formed as a rigid ring.

An annular skirt 430 extends from the annular base 422. The skirt 430 extends from the base 422 to a skirt rim 431. Like the base rim 426, the skirt rim 431 also contacts the planar surface of the structure 410 around at least substantially the full closed circumference of the skirt rim 431. The portion of the skirt forming the skirt rim 431 is rigid. An annular pocket 432 is provided between the skirt 431 and the base 422. The annular pocket 432 acts as an annular sealing volume.

A joint 450 extends between the base 422 and the cap upper 423. The joint 240 provides for the skirt 430 and base 422 to pivot about the cap upper 423. As such, the skirt 430 and base 422 is movable relative to the cap upper 423. With this arrangement, the skirt 430 and base 422 are pivotable together relative to the cap upper. The skirt rim 431 and base rim 426 are pivotable together about the same plane.

The joint 450 is formed between the cap upper 423 and the base 422. The joint 450 is a deformable portion. The joint 450 in the present arrangement has a concertina configuration to allow portions of the cap body 420 either side of the joint 450 to move relative to each other. The cap upper 423 is able to accommodate an offset of the axis of the aperture. The concertina configuration allows the joint to deform. The joint 450 has a reduced wall thickness. The concertina configuration of the joint 450 extends circumferentially about the base 422. The joint 450 is integrally formed with the remainder of the cap body 420. This ensures that there is no flow path through the cap body 420 to the air cavity 424.

Alternative arrangements of the joint 450 are envisaged. For example, the cap upper 423 may be deformable. Such an embodiment is shown in FIGS. 10 and 11. The cap 400 generally corresponds to the caps described above and so a detailed description of common features will be omitted below. In such an arrangement as shown in FIGS. 10 and 11, the skirt 430 and base 422 are integrally formed as a one part component. The skirt 430 and base 422 are formed from a rigid material. The cap upper 423 is formed from a resilient material. The cap upper 423 is deformable. The cap upper 423 is able to move relative to the skirt 430 and base 422.

When the fastener 120 is inserted, the cap upper 423 is able to deform to accommodate the end of the fastener 120. The cap upper 423 is able to move to align its axis with the fastener axis. As such, the cap upper 423 is able to move relative to the skirt rim 431 and base rim 426. The cap upper 423 is able to accommodate an offset of the axis of the aperture. When the fastener 120 is received by the cap, the end of the fastener 120 does not therefore urge the skirt rim 431 and base rim 426 away from the structure 410.

Although the embodiments of cap described above are described by reference to use with a blind fastener, such as a blind rivet, it will be understood that the caps may be used with other fasteners, such as nuts and bolts. In such an arrangement, the fastener may be inserted through the structure to protrude from the structure prior to positioning of the cap.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A spark containment cap for forming a sealed cavity around an end of a fastener protruding from a structure, the spark containment cap comprising:
    a cap body defining an air cavity arranged to enclose the end of the fastener, and including an annular base with a base rim, wherein the annular base terminates at the base rim which surrounds an opening into the air cavity;
    an annular skirt configured to provide an annular sealing volume extending around the base rim and arranged to receive an annular bead of a curable sealing material around the opening into the cavity to provide a seal between the cap body and the structure to seal a volume of gas within the cavity;
    a cap upper of the cap body, wherein the cap upper is arranged to receive at least part of the end of the fastener, the cap upper being positionable so that an axis of the cap upper is offset from an axis of the annular skirt, and
    a ball joint between the annular skirt and the cap upper.

2. The spark containment cap of claim 1, wherein the offset is an angular offset.

3. The spark containment cap of claim 1, wherein a juncture of the joint is in the annular sealing volume.

4. The spark containment cap of claim 1, wherein the joint is on an external side of the cap body.

5. The spark containment cap of claim 1, wherein the skirt portion is rigid.

6. The spark containment cap of claim 1, further comprising a sealing material inlet communicating with the annular sealing volume, and an air outlet communicating with the annular sealing volume,
    wherein the air outlet is formed through the annular skirt.

7. The spark containment cap of claim 1, wherein the axis of the annular skirt is offset from an axis of the base rim.

8. The spark containment cap of claim 7, wherein the annular base is configured to pivot with the cap upper.

9. The spark containment cap of claim 1, wherein the cap upper is deformable.

10. A cap assembly comprising:
    the spark containment cap according to claim 1, and a cured sealing material.

11. The spark containment cap of claim 1, wherein the fastener is a blind fastener.

12. A fastener joint comprising:
    a structure;
    a fastener having an end protruding from a surface of the structure; and
    a spark containment cap including:
        a cap body including a cap upper and an annular base, the cap body defining an air cavity arranged to enclose the end of the fastener and the annular base terminating at a base rim which surrounds an opening into the air cavity;
        an annular skirt with a skirt rim configured to provide an annular sealing volume extending around the base rim and arranged to receive an annular bead of a curable sealing material around the opening into the cavity to provide a seal between the cap body and the structure to seal a volume of gas within the cavity;
        a ball joint between the cap upper and the annular skirt configured to allow the cap upper to pivot relative to the annular skirt, and
        a cured sealing material in the annular sealing volume securing the cap to the structure to thereby seal a volume of gas within the air cavity;
        wherein an axis of the fastener extends non-perpendicular to the surface, the skirt rim extends parallel to the surface, and at least part of the cap body is parallel to the axis of the fastener.

13. A method of securing a fastener and a spark containment cap to a structure, the method comprising:
    locating the spark containment cap over an aperture for receiving an end of the fastener to form an air cavity defined by a cap body and arranged to enclose the end of the fastener, the spark containment cap including an annular base terminating at a base rim which surrounds an opening into the air cavity, and an annular skirt to provide an annular sealing volume extending around the base rim;
    positioning a cap upper of the spark containment cap to be at least substantially parallel with an axis of the aperture;
    injecting an annular bead of a curable sealing material around the opening into the cavity to provide a seal between the cap body and the structure to seal a volume of gas within the cavity, and
    pivoting the cap relative to the annular skirt about a ball joint between the cap upper and the annular skirt.

* * * * *